Feb. 20, 1968     O. W. CHRISTENSSON     3,369,392
METHOD AND APPARATUS FOR VACUUM TESTING PLASTIC
LINED CARD-BOARD CARTONS
Filed Sept. 13, 1965
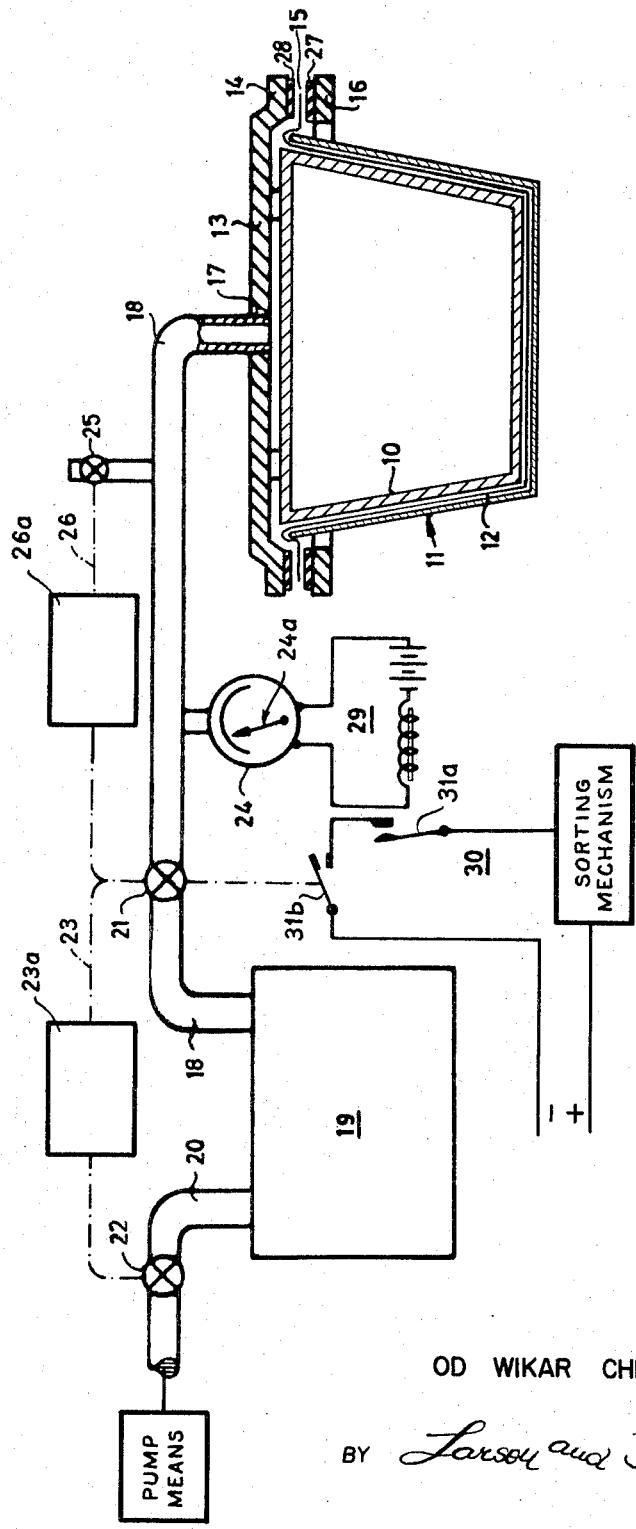
INVENTOR
OD WIKAR CHRISTENSSON
BY *Larson and Taylor*
ATTORNEYS United States Patent Office 3,369,392
Patented Feb. 20, 1968

3,369,392
METHOD AND APPARATUS FOR VACUUM
TESTING PLASTIC LINED CARD-BOARD
CARTONS
Od Wikar Christensson, Ekbacksvagen 32–34,
Ulvsunda, near Stockholm, Sweden
Filed Sept. 13, 1965, Ser. No. 486,821
Claims priority, application Sweden, Mar. 8, 1965,
2,984/65
21 Claims. (Cl. 73—49.2)

ABSTRACT OF THE DISCLOSURE

A method and apparatus for testing the air-tight integrity of a plastic-lined cardboard carton. A mandrel shaped to fit the inner contour of the carton and having an uneven surface is placed in the carton. With the use of a separate pre-evacuated vacuum chamber the carton is evacuated and any subsequent increase in pressure due to air leakage is observed. The pressure increase could close an electrical circuit to automatically operate a mechanism to reject unacceptable cartons.

*Background.—Field of the invention*

This invention relates to carton testing, and in particular it relates to a method and apparatus for testing the airtight integrity of a plastic-lined carton.

*Background.—Description of the prior art*

It has become quite common to pack various types of food material such as butter, margarine, jam, marmalade or the like in cup-like packages of various shapes and sizes.

To be used for the purpose of packaging food such packages must meet certain requirements. First, they must be relatively inexpensive in comparison with the price of the material contained therein so that the final sale price of the product together with the package will be competitive. Secondly, the package should be air-tight so that the product does not leak out or escape in any manner to discolor or soil the exterior of the package or adjacent packages which may be provided with decoration, labelling, etc. And of course, the package should also have a generally hygienic and attractive appearance.

It has previously been proposed to produce these cuplike packages from a plastic material. However, to obtain the necessary rigidity one would have to use a relatively thick plastic. Consequently, considering the cost of known plastic materials, it is unlikely that such a package could be produced and sold at a competitive price.

It has thus been proposed that the package be produced from a relatively inexpensive material such as cardboard, which is sufficiently stiff to give the package the required rigidity. The cardboard carton frame would then be lined with a thin air-impervious plastic liner by suitable methods such as deep pressing or the like.

However, such a plastic liner is also quite expensive. Therefore, to arrive at a final product which is competitive in price, it is necessary to reduce the thickness of the liner as much as possible. However, as the thickness of the liner becomes less, it becomes more probable that some of the cartons produced by this procedure will not be sufficiently air-tight. It becomes important, therefore, that such leaking cartons be sorted out from the manufacturing process before they are filled with food material or other product and placed into commerce.

For this reason, it is necessary that leaking cartons be sorted out before the package is filled with food material and sealed. The present invention is concerned with a method and apparatus for testing plastic lined cardboard cartons for leakage.

Several procedures are known which employ a vacuum for testing the cartons for leakage. However, these known methods are not suitable for packages of the present type since at least the thin plastic liner and probably also the carton itself would be wrinkled and destroyed when the interior of the package was subjected to the vacuum pressure. For example, in one known procedure the open top of the container is provided with a tightly closed lid, through which a vacuum conduit connects the interior of the package to a vacuum source. One could then observe the air tightness of the package by noting any change in the amount of the vacuum over a predetermined time. Thus, if the vacuum in the package successively decreased after its connection to the interior of the package, then the package would not be air-tight.

According to another known vacuum testing procedure the carton is provided with a tightly closed lid and the carton is then placed within an enclosed air-tight container which is then subjected to vacuum conditions. In the same manner as in the previous example one could then determine whether or not the carton leaks by observing the change in the vacuum of the enclosed container. That is, if the package were not air-tight then the air within the carton would leak out into the container and thus decrease the vacuum. However, the pressure differential by these known vacuum methods would tend to distort, wrinkle or destroy the cartons themselves.

Procedures are also known for testing the air-tight integrity of a package by air under pressure. However, these procedures are not suitable for use with cartons to be used for food materials. Food cartons are generally produced in machines working in sterilized air; or the packages are subsequently sterilized after production. If the cartons are then tested with air under pressure it is inevitable that the sterile condition of the cartons will be lost unless the air under pressure has itself been sterilized before its compression. However, sterilization of air for testing purposes is too tedious and expensive to be practical.

Further, when using air under pressure it would be virtually impossible to keep the interior of a compressor free of bacteria. Thus, it would be quite probable that bacteria would be introduced into the packages during the testing procedure, and that the bacteria might later attack the food packed therein. Also, in compressors it is quite difficult to avoid at least a trace of a mist of oil or atmospheric impurities from entering the pressurized air before the air is introduced into the interior of the cartons being tested.

*Background.—Production of cartons to be tested*

The present invention is particularly suitable for testing cartons of the type formed by an outer stiff material such as cardboard and the like and including a thin plastic liner on the interior surface. Such cartons are produced in the following manner.

The outer cardboard material is generally formed by manipulating a cardboard blank so that the sides of the carton, which are rigidly attached to the bottom thereof, are folded up and attached to each other. Such a cardboard cover would itself be air-tight with the exception of small openings and/or narrow slots at the points near the bottom between adjacent folded-up sides.

The plastic is then deep-drawn into the cardboard carton to form an air-tight liner within the package. This procedure may be carried out by applying pressure to the plastic material urging it into the carton, but preferably by applying a vacuum to the outer side of the cardboard carton or to draw the plastic film into the carton.

As noted earlier, the plastic material is rather expensive and therefore, to reduce the cost of production, the liner is made as thin as possible. The plastic film is first thinned out as much as possible and then it is further thinned out as it is deep-drawn into the carton. This thinning which occurs during the deep-drawing process causes an especially large strain to be applied to the portion of the plastic film which overlies the bottom corners of the carton since the vacuum source is applied to the interior of the carton primarily through the interspaces at the corners. Therefore, most of the liner breakage which occurs during the deep-drawing step will occur at these corners. Ruptures of this nature are positioned in close relationship to the slots in the cardboard cover. Thus, such ruptures are the most dangerous since any food or other material packed within such a carton would very easily leak through the carton and the slot to the exterior of the package. However, while such ruptures are the most serious, they are also the easiest type to observe. Such ruptures may be detected during the deep-drawing process itself. Air being withdrawn through these liner crevices and through the slots in the bottom of the cardboard would tend to reduce the vacuum created by the deep-drawing vacuum source. This could be detected quite readily on a pressure gauge, manometer or the like. Such a package would then be immediately sorted out from the production line.

However, there may also be another type of leakage, and this type may occur at any location in the package and not necessarily at the bottom corners of the package where they could be easily detected. The plastic film used to make the liner is produced by pressure methods from a raw material which is usually in the form of a powder or granules or the like. Therefore, it is quite possible for foreign substances to be introduced into the raw material and subsequently form a weakened portion in the plastic film produced from that raw material. Subsequently, as the film is thinned out in the area of this foreign particle, and assuming the foreign particle will not have the same properties as the plastic material surrounding it, and assuming it cannot be deep-drawn or pressed to the same extent as the plastic, then thinning out of the plastic will cause leakage to occur in the material in the area surrounding the foreign particle. Also, leakage could occur as a result of an air blister which was included with the raw material as it was converted to plastic film.

Because of these foreign particles and air blisters, microscopically small leakages may occur, and these will not be localized at the bottom corners of the package, and thus will not be readily detected. In fact, since the film all about the microscopic opening will be in contact with the cardboard cover, the cardboard cover will act as a valve to prevent a substantial flow of air between the microscopic opening and the slots in the lower corners of the carton. Thus, small leakage of this nature will not be sorted out of the manufacturing line.

*Summary of the invention*

The purpose of the present invention is to eliminate the disadvantages of methods and apparatus known heretofore and to provide a method and apparatus with which any type of leakage in a plastic-lined cardboard carton of the above-mentioned kind, including very small or microscopic imperfections, may be detected without deforming or damaging the carton in any way and without contaminating the carton with oil mist, impurities from the air, or bacteria. Further, the method and apparatus of the present invention are relatively simple.

The present invention thus refers to a method and apparatus for vacuum testing the air-tight integrity of a carton comprising an outer, non-air-tight cover of cardboard or a similar stiff material and a liner introduced to the interior thereof formed of a thin, air-tight plastic material, the said plastic material having a flange extending outwardly from the interior of the carton all around the open edge of the carton.

According to the method of the present invention the outwardly extending flanges of the plastic liner are brought into contact with the upper side of a support ledge, and are pressed firmly into a resilient material formed on said ledge to form therewith an air-tight seal. Engagement of the flange with the ledge is brought about by lowering a lid downwardly onto the carton, wherein the outer edge of the lid includes a resilient material and corresponds in shape to that of the ledge. As the lid is so lowered a mandrel is lowered into the interior of the carton to fit snugly against the interior thereof to hold the same in shape during the testing step. With the lid and mandrel in place a vacuum chamber, which has been previously evacuated and closed off from the atmosphere, is connected by a suitable conduit to the area enclosed by the lid and the carton. The pressure in the enclosed area, that is, in the carton, will, of course, immediately decrease below atmospheric. This initial drop in pressure is read on a suitable pressure gauge. The pressure gauge is then observed for a predetermined period of time after the initial pressure drop. An increase in pressure of a predetermined amount over a predetermined period of time would indicate a leak in the carton.

The present invention also includes a novel and patentable apparatus for carrying out the invention. The apparatus includes a support ledge against which an outwardly directed flange of an inner liner can be placed. The invention further includes a cover member or lid which is adapted to press against the flange of the liner as it rest on the ledge. The lid also includes a mandrel attached thereto. The outer surface of the mandrel is shaped to fit snugly within the interior of the carton. The lid also includes an aperture connected to a conduit which in turn leads to a vacuum chamber. Suitable pump means are provided for evacuating the said vacuum chamber. A first valve controls the flow through the conduit from the vacuum chamber to the interior of the carton while a second valve controls the flow of gas between the vacuum chamber and the pump means. The invention also includes a third valve for controlling the flow of atmospheric air into the enclosed carton area and a pressure gauge for sensing the pressure in the enclosed carton area during the testing procedure. In addition, means may be provided for automatically responding to pressure conditions representing an unacceptable carton for operating a carton rejection apparatus.

Thus, it is an object of this invention to provide an improved testing method and apparatus which overcomes disadvantages of methods and apparatus known heretofore.

It is still another object of this invention to provide a new and improved method and appartus for testing a plastic lined cardboard carton for leakage.

It is still another object of this invention to provide a method and apparatus for testing a plastic lined cardboard corton wherein the plastic lining is held in place during the testing procedure and the vacuum producing means are so controlled that the package is neither damaged, wrinkled nor destroyed during the testing procedure.

Other objects and the attendant advantages of the present invention will become apparent from the detailed description to follow together with the accompanying drawing.

*Brief description of the drawing*

The detailed description to follow, together with the accompanying drawing are provided for purposes of illustrating a preferred embodiment of the invention. However, it is to be understood that the invention is capable of numerous modifications and variations apparent to those skilled in the art without departing from the spirit and scope of the invention as defined in the claims.

The single drawing illustrates schematically the method and the apparatus of the present invention.

Description of the preferred embodiments

Referring to the drawing, the invention includes a mandrel 10 of a suitable stiff material such as metal, the outer sides of which are shaped to fit snugly against the interior of the carton 11 and especially against the inner sides of the liner 12. The mandrel 10 is attached to but somewhat spaced from a cover member or lid 13. The lid 13 includes a flange 14 located around the periphery of the lid 13 and on a somewhat lower level than that of the lid 13. The lid 13 is arranged to press downwardly by means of the flange 14 onto an outwardly directed flange 15 of the liner 12 of the carton 11 and to press the flange 15 against a support ledge 16.

At approximately the center of the lid 13 there is provided an opening 17 connected to a transfer conduit 18 which is in communication with a vacuum chamber 19. The vacuum chamber 19 is in turn connected through a suitable conduit 20 to a means for creating a vacuum such as a vacuum pump. In the transfer conduit 18 between the vacuum chamber 19 and lid 13 there is provided a shut-off valve 21. A second valve 22 is provided in conduit 20 between vacuum chamber 19 and the pumping means. The two valves 21 and 22 are connected by suitable mechanical means, as indicated by dot-dash line 23 and connecting means 23a in the drawing, so that the valve 21 in the transfer conduit 18 cannot be opened until the valve 22 in the conduit 20 has been closed.

A pressure gauge 24 having a pointer 24a is located for measuring and indicating the pressure in the transfer conduit 18, which pressure is indicative of the pressure in the enclosed area between the lid 13 and the liner 12. Also located in transfer conduit 18 is an inlet passage for atmospheric air, the flow of which is controlled by a valve 25. This inlet valve 25 may be suitably connected to the valve 21 in the transfer conduit 18 as indicated by dot-dash line 26 and connecting means 26a so that the inlet valve 25 will not open until shut-off valve 21 has been closed and so that the valve 25 is closed before the valve 21 in the transfer conduit 18 is again opened for the purpose of placing the carton and the vacuum chamber 19 in communication with each other.

The portions of the support ledge 16 and the lid flange 14 which come into contact with each other are provided with a suitable elastic material 27 and 28 respectively for assuring that an air-tight seal is formed therebetween when the flange 14 is pressed down onto the ledge 16. Preferably the surface of the mandrel 10 will be made uneven by suitable means such as blasting, knurling, perforating, grooving, rifling or the like. The purpose of the uneven surface on mandrel 10 is to prevent the liner 12 from being drawn flatly against the mandrel 10 thereby limiting the flow of gas from a leakage around the mandrel 10 and through the conduit 18. The uneven surface on the mandrel 10 will assure that gas will always flow from any given leak around the mandrel 10 and through the conduit 18 to be sensed by the pressure gauge 24.

The carton to be tested is supported by suitable means with its outwardly extending liner flange resting upon surface 27 of support ledge 16. The lid is then lowered so that flange 14, and in particular, elastic material 28, presses against the support ledge 16 forming an air-tight seal therewith and firmly retaining the flange 15. With the lid so lowered the raised portion of the uneven surface of mandrel 10 contacts the interior surface of the carton 11, and in particular of the liner 12 and thereby retains the carton and the liner in place so that they shall not be wrinkled nor damaged when the carton is subjected to vacuum conditions.

To perform the test, valve 22 is first opened while valve 21 is closed to connect the vacuum chamber 19 with a suitable vacuum source such as a vacuum pump. When the intended degree of vacuum has been achieved, the valve 22 is fully closed after which the valve 21 in the transfer conduit 18 is opened. Air within the area enclosed by the lid and carton is then immediately withdrawn through the conduit 18 to the chamber 19. The air will pass through the slight space provided between the mandrel 10 and the liner 12 or through the unevenness in the surface of the mandrel 10. Thus, the differential pressure force created by subjecting the interior of the carton to a vacuum chamber will act upon all parts of the liner 12. The pressure gauge 24, which is connected to the transfer conduit 18, now indicates a substantial pressure drop from atmospheric pressure existing just prior to the test to the new lower pressure which exists at the moment that the vacuum chamber 19 is connected through conduit 18 to the interior of the carton 11. The initial lower level of pressure indicated by pointer 24a is immediately observed. If the pointer remains at this new lower level for a predetermined period of time, it may be assumed that no air is leaking into the carton 11, and thus to the conduit 18. It may then be assumed that the carton 11 is acceptable and substantially void of leakage. However, if the indication on the pointer 24 continuously changes, this would indicate a leakage in the liner 12 whereby air is entering the carton through slots or crevices in the corners at the bottom of the carton and finding a path between the paper cover layer and the liner 12 and subsequently passing through a leakage in the liner 12 and then to the conduit 18. This movement of air through the carton tends to separate the liner 12 from the cover 11. This would seriously impair the operation of the device if the liner 12 then rested flatly against the surface of the mandrel 10. However, because of the uneven surface of the mandrel 10 this loosening of the liner causes no problems as air may always flow through the unevenness in the surface of the mandrel 10. Thus, as the magnitude of the vacuum decreases, indicating leakage in the carton, the pressure gauge pointer 24a will continue to move until it indicates atmospheric pressure. The unacceptable or faulty package thus detected is now sorted out from the manufacturing line.

However, as indicated above, if the position of the pointer 24a remains substantially unchanged, it may be assumed that the air-tight integrity of the carton being tested is satisfactory. This acceptable carton may then be removed from the testing apparatus to be filled and distributed. In order to so remove an acceptable carton from the apparatus the valve 21 is fully closed after which the air inlet valve 25 is opened. In this manner the interior of the carton and the conduit 18 are restored to atmospheric pressure. The lid 13 may then be removed without any difficulty and the package elevated from the support ledge 16 and removed from the apparatus. Simultaneously with the opening of the air inlet valve 25, the shut-off valve 22 between the pump means and the vacuum chamber 19 may then be opened thereby evacuating the vacuum chamber 19 thereby preparing the same for a subsequent test.

When the invention is applied in industrial use it may be desirable to include suitable means for automatically sorting out an unsatisfactory carton. For this purpose the pressure gauge 24 is provided with a set of contacts which are arranged to close an electrical circuit to activate a relay device 29 if the vacuum within the carton 11 and conduit 18 should decrease (that is, the absolute pressure increase) by a predetermined amount within a predetermined time period after the initial vacuum has been reached following opening of the valve 21. If the relay device 29 is so activated, it will close the contacts of a first switch 31a in an electrical circuit 30 through which the current passes, which controls operation of a suitable sorting mechanism for sorting out an unacceptable carton. The circuit 30 also includes a second switch 31b which is mechanically connected to the valve 21 in such a manner that the switch 31b will be closed only when the valve 21 is fully opened, and the switch 31b will be opened before the valve 21 has again been closed and before the air inlet valve has been opened.

Upon the initiation of a testing procedure when the valve 21 is opened, even before the valve 21 has been fully opened, (that is, before it has been opened to a sufficient extent to close contact 31b) the absolute pressure in the conduit 18, and thus the absolute pressure sensed by pressure gauge 24, will decrease quickly to a new initial value. During this initial movement the pointer 24a of the pressure gauge 24 will pass through the pressure level, which, at a later stage (that is, upon return movement of the pointer 24a) will close the contacts 24a to indicate a faulty package. Consequently, on this initial movement of pointer 24a the pointer will momentarily close the contacts in the circuit of relay 29 thereby causing activation of the relay 29 to close the switch 31a for an instant. However, the circuit 30 is open during this instant since valve 21 has not yet been fully opened and thus the switch 31b, connected to the valve 21, has not yet been closed. Thus, the sorting out mechanism will not yet operate.

When the pointer 24a has finally stopped at its new initial lower position the valve 21 will have opened fully, thereby causing the contacts 31b to close. If the carton being tested should then be unacceptable the pressure indicated by pointer 24a would increase until it reached a level which indicates that the carton is unacceptable at which time the contacts of relay circuit 29 would close. Since contacts 31b have already been closed, the closing of contacts 31a will completed the circuit 30 to activate the sorting mechanism to reject the unacceptable package.

Although the invention has been described and illustrated in considerable detail with respect to preferred embodiments thereof, it should be apparent that the invention is capable of numerous variations and modifications apparent to those skilled in the art without departing from the spirit and scope of the invention as defined in the appended claims.

What is claimed is:

1. A method for testing the air-tight integrity of an open-topped carton having an outer layer formed of a relatively stiff material and having an inner liner formed of a thin, normally air-impervious material, wherein the liner extends outwardly to form a flange all around the open top of the carton, comprising the steps of:
   placing the said flange on a support surface,
   moving a combined mandrel and lid towards the open top so that the mandrel fits snugly against the interior surface of the liner within the carton and the lid fits against the flange to form an enclosed area bounded by the air-impervious liner and the lid,
   subjecting the enclosed area to vacuum conditions by opening a conduit passage from the enclosed area to a previously evacuated and otherwise closed off vacuum chamber,
   observing the initial drop in pressure which occurs in the enclosed area upon the said opening of the conduit,
   and observing any pressure increase in the enclosed area for a predetermined period of time after the said initial pressure drop, whereby a rise in pressure of a predetermined amount within the said predetermined period would be indicative of the air leak in the normally air-impervious liner of the carton.

2. A method as claimed in claim 1, wherein the steps of observing pressure changes are performed with a pressure sensitive means responsive to pressure changes in the enclosed area and including the step of automatically sensing a leaking carton in response to a signal from the sensing means indicating a predetermined pressure change in a predetermined period of time.

3. A method as claimed in claim 2 wherein the said step of sensing a leaking carton is performed only after completion of the said initial pressure drop.

4. A method as claimed in claim 1 wherein the outer surface of the mandrel is uneven and the step of moving the mandrel against the interior surface of the carton is characterized by moving the mandrel so that a portion of the mandrel outer surface contacts the liner while the remainder of the mandrel surface remains free from contact with the liner.

5. A method as claimed in claim 4, wherein the steps of observing pressure changes are performed with a pressure sensitive means responsive to pressure changes in the enclosed area, and including the step of automatically sensing a leaking carton in response to a signal from the sensing means indicating a predetermined pressure change in a predetermined period of time.

6. A method as claimed in claim 5 wherein the said step of sensing a leaking carton is performed only after completion of the said initial pressure drop.

7. An apparatus for testing the air-tight integrity of an open-topped carton having an outer layer formed of a relatively stiff material and having an inner liner formed of a thin, normally air-impervious material wherein the liner extends outwardly to form a flange all around the open top of the carton, comprising:
   a ledge means for supporting the outwardly extending flange all around the open top of the carton,
   a cover member having a flange shaped to fit snugly against the liner flange to form an enclosed area bounded by the liner and the cover member,
   a mandrel attached to the cover member and shaped to fit snugly against the interior surface of the liner, within the carton,
   a vacuum chamber connected to said enclosed area by a conduit,
   a first valve for selectively opening or closing off said conduit and pressure sensitive means for measuring the pressure in the enclosed area,
   a pump means for evacuating the said vacuum chamber while the said first valve closes the conduit, and
   a second valve for selectively closing off the vacuum chamber from the pumping means.

8. An apparatus as claimed in claim 7 wherein the outer surface of the mandrel facing the interior of the liner is uneven so that only intermittent portions of the mandrel can be physically contacted by the said liner.

9. An apparatus as claimed in claim 7 including an elastic material on said ledge means and on said cover member flange for contacting the top and bottom of the liner flange respectively, to form an air-tight seal for the said enclosed area.

10. An apparatus as claimed in claim 7 including means operable in response to a signal from the said pressure sensitive means which occurs when the pressure in the enclosed area has increased by a predetermined amount in a predetermined period of time for sorting out the leaking carton.

11. An apparatus as claimed in claim 10 wherein the last said means includes an electric contact on said pressure sensitive means closable in response to said signal to operate a relay means for closing a first switch in an electrical circuit containing an electrically controlled sorting device.

12. An apparatus as claimed in claim 11 wherein said circuit further includes a second switch connected to said first valve so that the second switch is closed only when the first valve fully opens the said conduit.

13. An apparatus as claimed in claim 7 including a means for connecting said first and second valve so that the first valve can open the said conduit only when the second valve is closed.

14. An apparatus as claimed in claim 13 including an air inlet passage for introducing air at atmospheric pressure into the said enclosed area, and including a third valve for controlling the flow of air through said air inlet passage.

15. An apparatus as claimed in claim 14 including a means for connecting said third valve with said first and second valves so that the third valve will not open the air inlet passage until after a predetermined period of time has elapsed after the first valve has been opened to connect the enclosed area with the evacuated vacuum chamber.

16. An apparatus as claimed in claim 15 wherein said means connecting the third valve with the first and second valve further includes the means for permitting the third valve to open the air inlet passage only while the said first valve is closed.

17. An apparatus as claimed in claim 16 wherein the outer surface of the mandrel facing the interior of the liner is uneven so that only intermittent portions of the mandrel can be physically contacted by the said liner.

18. An apparatus as claimed in claim 17 including an elastic material on said ledge means and on said cover member flange for contacting the top and bottom of the liner flange respectively, to form an air-tight seal for the said enclosed area.

19. An apparatus as claimed in claim 18 including means operable in response to a signal from the said pressure sensitive means which occurs when the pressure in the enclosed area has increased by a predetermined amount in a predetermined period of time for sorting out the leaking carton.

20. An apparatus as claimed in claim 19 wherein the last said means includes an electric contact on said pressure sensitive means closable in response to said signal to operate a relay means for closing a first switch in an electrical circuit containing an electrically controlled sorting device.

21. An apparatus as claimed in claim 20 wherein said circuit further includes a second switch connected to said first valve so that the second switch is closed only when the first valve fully opens the said conduit.

References Cited

UNITED STATES PATENTS

| | | | |
|---|---|---|---|
| 2,041,450 | 5/1936 | Adams | 73—40 |
| 2,762,736 | 9/1956 | Beuglet | 73—40 X |
| 2,853,874 | 9/1958 | Mennesson | 73—40 |
| 3,106,835 | 10/1963 | Henderson | 73—40 X |
| 3,177,704 | 4/1965 | Stange | 73—40 X |

LOUIS R. PRINCE, *Primary Examiner.*

J. NOLTON, *Assistant Examiner.*